(12) United States Patent
Tsuji

(10) Patent No.: US 6,229,966 B1
(45) Date of Patent: *May 8, 2001

(54) CAMERA

(75) Inventor: Kanji Tsuji, Kitsuki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/109,846

(22) Filed: Jul. 2, 1998

(30) Foreign Application Priority Data

Jul. 11, 1997 (JP) .................................................. 9-186688

(51) Int. Cl.$^7$ .............................. G03B 17/02; G03B 9/36
(52) U.S. Cl. ........................... 396/538; 396/486; 396/535
(58) Field of Search .............................. 396/6, 415, 535, 396/538, 541, 486

(56) References Cited

U.S. PATENT DOCUMENTS 5,585,876 * 12/1996 Kobayashi ........................... 396/538
5,875,369 * 2/1999 Yamashina et al. ................. 396/538

* cited by examiner

*Primary Examiner*—Alan A. Mathews
(74) *Attorney, Agent, or Firm*—Robin, Blecker & Daley

(57) ABSTRACT

In a camera, at least a part of a wall portion of at least one of a film take-up spool chamber and a film-cartridge loading chamber is formed with a shutter mechanism.

4 Claims, 2 Drawing Sheets

CAMERA

BACKGROUND OF THE INVENTION

1. Field of the Invention

The present invention relates to a camera, and more particularly to a structural arrangement developed for reduction in size of the camera.

2. Description of Related Art

In some of known cameras, in order to reduce the size thereof, a part of a wall portion which encompasses a spool chamber containing a film take-up spool therein is formed with a lens-barrel constituting member which constitutes a photo-taking lens barrel. Further, there are known cameras the size of which in the width direction is reduced by mounting on the lens-barrel constituting member a pressing means such as a roller for pressing the film against the film take-up spool to smoothly wind the film onto the spool.

However, such a structural arrangement applies only to a camera having a suitable lens-barrel constituting member which constitutes a zoom mechanism or a lens-barrel stowing (withdrawing) mechanism, and is hardly applicable to cameras not having such a lens-barrel constituting member.

In the case of cameras of the kind having no lens-barrel constituting member, if the whole wall portion of the spool chamber is formed with a camera body and, in addition, a shutter mechanism, etc., are mounted on the camera body, the size of the camera in the width direction tends to become large.

BRIEF SUMMARY OF THE INVENTION

In accordance with one aspect of the invention, there is provided a camera in which at least a part of a wall portion of at least one of a film take-up spool chamber and a film-cartridge loading chamber is formed with a shutter mechanism, so that the size of the camera can be reduced.

The above and other aspects of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

Figure 1:
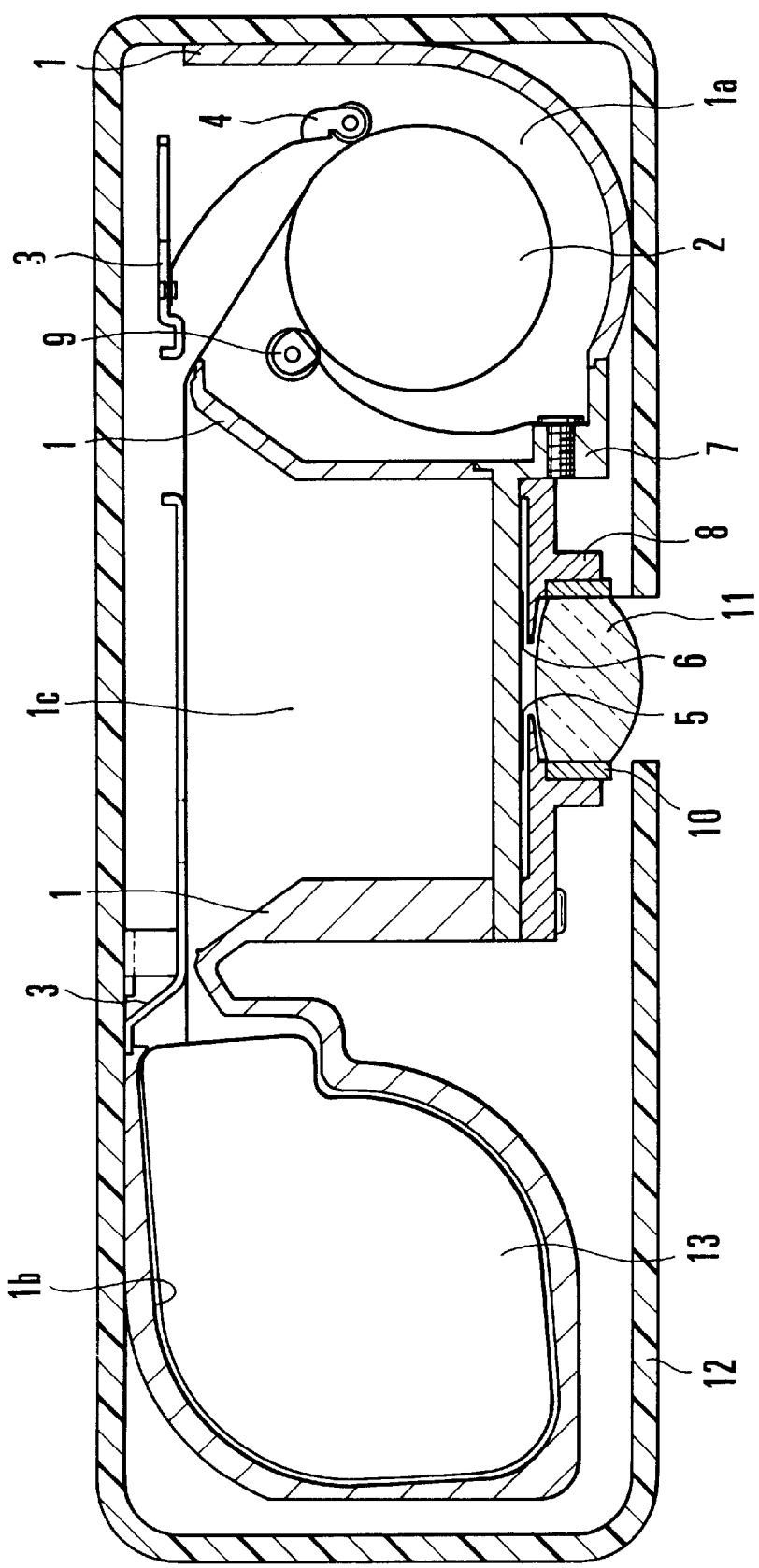
FIG. 1 is a transverse sectional view of a camera according to a first embodiment of the invention.

FIG. 1 shows in a transverse sectional view a camera according to a first embodiment of the invention. Referring to FIG. 1, a camera body 1 of the camera is provided with a wall portion forming a spool chamber 1a (hereinafter referred to as the spool-chamber forming wall) and another wall portion forming a cartridge chamber 1b. A film take-up spool 2 is disposed within the spool chamber 1a and is rotatably mounted on the camera body 1. A pressure plate 3 is disposed in rear of an aperture part 1c of the camera body 1. A first film pressing member 4 is mounted on the pressure plate 3 and is arranged to press a film against the film take-up spool 2.

The camera is provided with shutter blades 5 and 6. A shutter base member 7 which slidably holds the shutter blades 5 and 6 is mounted in front of the aperture part 1c of the camera body 1. Further, one end part of the shutter base member 7 on the side of the spool chamber 1a constitutes a part of the spool-chamber forming wall. On the end part of the shutter base member 7 on the inner side of the spool chamber 1a, there is mounted a second film pressing member 9 which is arranged to press the film against the film take-up spool 2.

A shutter-blade retaining member 8 is disposed in front of the shutter base member 7 and is arranged to hold the shutter blades 5 and 6 in position between the shutter base member 7 and the shutter-blade retaining member 8. A lens holding member 10 is mounted on the inner side of a tubular part which is formed in the front part of the shutter-blade retaining member 8. A photo-taking lens 11 is held on the inner side of the lens holding member 10.

An exterior member 12 is arranged in a box-like shape to cover the camera body 1. Reference numeral 13 denotes a film cartridge 13, which is loaded into the cartridge chamber 1b. The film, which has been thrust out from the film cartridge 13, is led to the spool chamber 1a along the pressure plate 3, and is then taken up and wound on the spool 2, which is driven to rotate by a driving mechanism (not shown). At that time, the first and second film pressing members 4 and 9 press the film against the film take-up spool 2 so as to make the process of winding the film on the spool 2 smoothly performed.

According to the arrangement of the first embodiment, an end part (end part in the width direction), on the side of the spool chamber 1a, of the shutter base member 7 serves also as a part of the spool-chamber forming wall. Besides, the spool-chamber forming wall itself acts to hold the shutter base member 7, that is, the whole shutter mechanism, i.e., components 5, 6 7 and 8. Therefore, as compared with a camera in which the whole spool-chamber forming wall is completely formed with the camera body and the shutter base member is mounted on a portion which is separately provided on the spool-chamber forming wall to hold the shutter base member, the arrangement according to the first embodiment permits reduction in lateral dimension of the spool-chamber forming wall and that of parts around the aperture part, so that the size of the camera in the width direction can be reduced.

Further, since the second film pressing member 9 and the shutter-blade retaining member 8 are mounted on the shutter base member 7 so as to have these parts arranged in one unit as a shutter mechanism, the number of parts of the camera can be reduced, and assembly work thereon can be facilitated.

Figure 2:
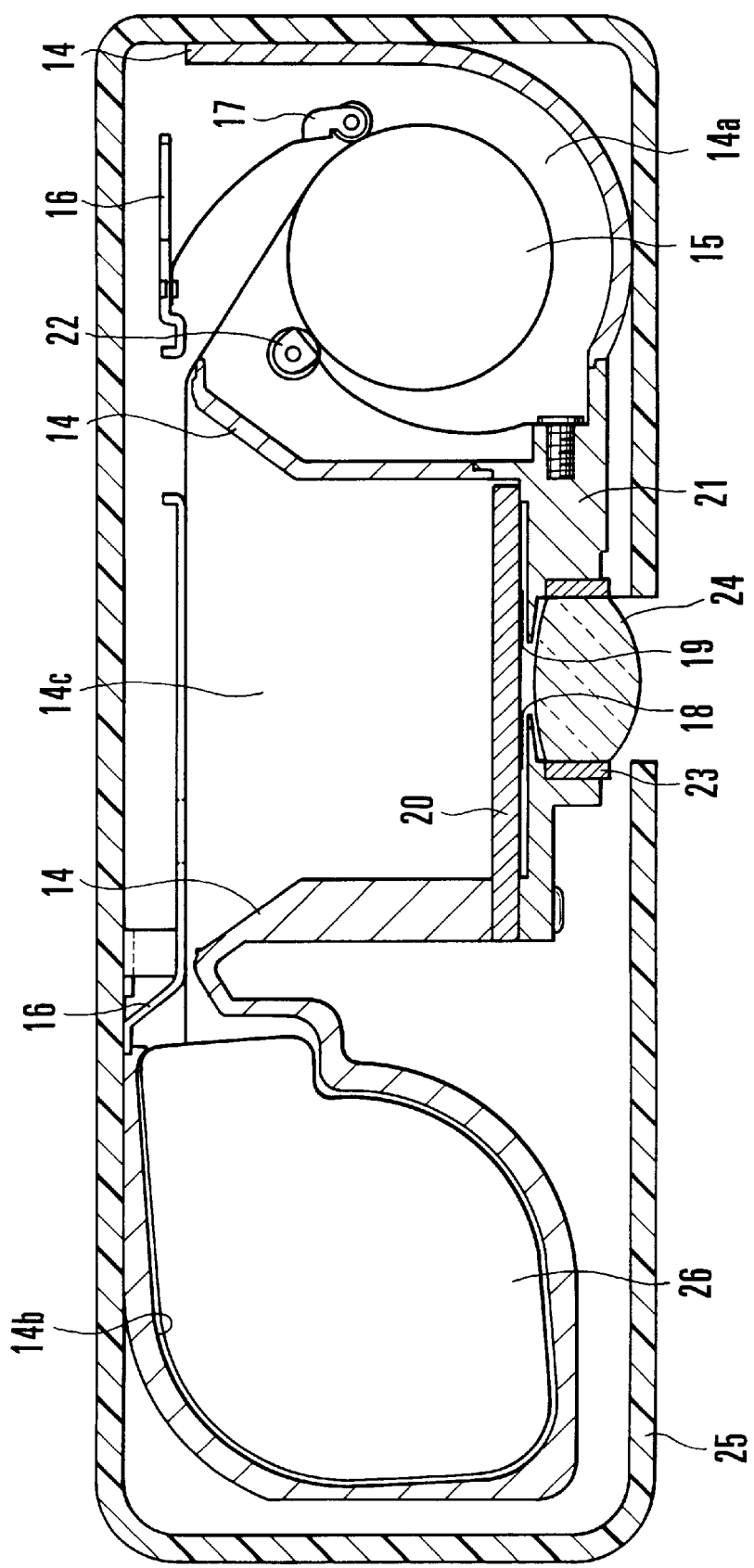
FIG. 2 is a transverse sectional view of a camera according to a second embodiment of the invention.

FIG. 2 shows in a transverse sectional view a camera according to a second embodiment of the invention. Referring to FIG. 2, a camera body 14 of the camera is provided with a wall portion forming a spool chamber 14a (hereinafter referred to as the spool-chamber forming wall) and another wall portion forming a cartridge chamber 14b. A film take-up spool 15 is rotatably mounted on the camera body 14 and is disposed within the spool chamber 14a. A pressure plate 16 is disposed in rear of an aperture part 14c of the camera body 14. A first film pressing member 17 is mounted on the pressure plate 16 and is arranged to press a film against the film take-up spool 15.

The camera is provided with shutter blades 18 and 19. A shutter base member 20 which slidably holds the shutter blades 18 and 19 is mounted in front of the aperture part 14c of the camera body 14.

A shutter-blade retaining member 21 is disposed in front of the shutter base member 20 and is arranged to hold the shutter blades 18 and 19 in position between the shutter base member 20 and the shutter-blade retaining member 21. One end part of the shutter-blade retaining member 21 on the side of the spool chamber 14a constitutes a part of the spool-chamber forming wall. On the end part of the shutter-blade retaining member 21 on the inner side of the spool chamber 14a, there is mounted a second film pressing member 22 which is arranged to press the film against the film take-up spool 15.

A tubular part is formed in the front part of the shutter-blade retaining member 21 to hold a photo-taking lens 24 on the inner side thereof through a lens holding member 23.

An exterior member 25 is arranged in a box-like shape to cover the camera body 14. Reference numeral 26 denotes a film cartridge which is loaded into the cartridge chamber 14b. The film, which has been thrust out from the film cartridge 26, is led to the spool chamber 14a along the pressure plate 16 and is then taken up and wound on the film take-up spool 15, which is driven to rotate by a driving mechanism (not shown). At that time, the first and second film pressing members 17 and 22 press the film against the film take-up spool 15 so as to make the process of winding the film on the spool 15 smoothly performed.

According to the arrangement of the second embodiment, an end part (end part in the width direction), on the side of the spool chamber 14a, of the shutter-blade retaining member 21 serves also as a part of the spool-chamber forming wall. Besides, the spool-chamber forming wall itself acts to hold the shutter-blade retaining member 21, that is, the whole shutter mechanism, i.e., components 18, 19, 20 and 21. Therefore, as compared with a camera in which the whole spool-chamber forming wall is completely formed with the camera body and the shutter-blade retaining member is mounted on a portion which is separately provided on the spool-chamber forming wall to hold the shutter-blade retaining member, the arrangement according to the second embodiment permits reduction in lateral dimension of the spool-chamber forming wall and that of parts around the aperture part, so that the size of the camera in the width direction can be reduced.

Further, since the second film pressing member 22 and the photo-taking lens 24 are mounted on the shutter blade retaining member 21 to have these parts arranged in one unit with the shutter mechanism, the number of parts of the camera can be reduced, and assembly work thereon can be facilitated.

The individual components shown in schematic or block form in the drawings are all well known in the camera arts and their specific construction and operation are not critical to the operation or best mode for carrying out the invention.

While the invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, while in each of the embodiments described above the shutter mechanism forms a part of the wall portion of the spool chamber, the shutter mechanism may be arranged to form the whole wall portion of the spool chamber or to form a part of the cartridge chamber wall or the whole cartridge chamber wall as well as the spool chamber wall.

The invention is applicable to an image recording medium other than a film.

The invention may be carried out by combining as necessary the embodiments or their technological elements described in the foregoing.

The invention applies to cases where either the whole or a part of claims or the arrangement of each embodiment described forms one apparatus or is used in combination with some other apparatus or as a component element of an apparatus.

Further, the invention is applicable to cameras of varied kinds, such as a single-lens reflex camera, a lens-shutter type camera, a video camera, etc., optical apparatuses other than cameras, devices adapted for cameras, optical apparatuses and other apparatuses, and component elements forming these apparatuses and devices.

What is claimed is:

1. A camera comprising:
    (A) a film take-up spool chamber;
    (B) a film-cartridge loading chamber;
    (C) an exposure chamber;
    (D) a wall having a surface on one side contacted with said film take-up spool chamber and a surface on an opposite side contacted with said exposure chamber; and
    (E) a shutter blade supporting member for supporting shutter blades, said shutter blade supporting member forming at least a part of a wall portion of at least one of said film take-up spool chamber and said film-cartridge loading chamber.

2. A camera according to claim 1 wherein said shutter blade supporting member supports said shutter blades for sliding movement.

3. A camera according to claim 1, further comprising a pressing device which presses a film against a film take-up spool disposed within said film take-up spool chamber, said pressing device being mounted on said shutter blade supporting member.

4. A camera according to claim 1, further comprising a photo-taking optical system, said photo-taking optical system being mounted on said shutter blade supporting member.

* * * * *